US009232481B1

(12) United States Patent
Devine et al.

(10) Patent No.: US 9,232,481 B1
(45) Date of Patent: Jan. 5, 2016

(54) EQUIPMENT, SYSTEM AND METHODOLOGIES FOR ROBUST COVERAGE IN A BROADCAST AREA

(71) Applicants: Christopher F. Devine, Winnetka, IL (US); Richard J. Bonick, Evanston, IL (US); William R. Hieatt, Colleyville, TX (US)

(72) Inventors: Christopher F. Devine, Winnetka, IL (US); Richard J. Bonick, Evanston, IL (US); William R. Hieatt, Colleyville, TX (US)

(73) Assignee: GEO-BROADCAST SOLUTIONS, LLC, Chicago, IL (US)

( * ) Notice: Subject to any disclaimer, the term of this patent is extended or adjusted under 35 U.S.C. 154(b) by 0 days.

(21) Appl. No.: 14/330,673

(22) Filed: Jul. 14, 2014

(51) Int. Cl.
*H04B 7/00* (2006.01)
*H04W 52/28* (2009.01)
*H04H 20/18* (2008.01)
*H04H 20/42* (2008.01)

(52) U.S. Cl.
CPC ............ *H04W 52/283* (2013.01); *H04H 20/18* (2013.01); *H04H 20/423* (2013.01)

(58) Field of Classification Search
None
See application file for complete search history.

(56) References Cited

U.S. PATENT DOCUMENTS

| | | | |
|---|---|---|---|
| 3,639,686 A | 2/1972 | Walker et al. | |
| 4,720,873 A | 1/1988 | Goodman et al. | |
| 4,864,564 A | 9/1989 | Parker et al. | |
| 5,117,503 A | 5/1992 | Olson | |
| 5,155,591 A | 10/1992 | Wachob | |
| 5,408,417 A | 4/1995 | Wilder | |
| 5,471,642 A | 11/1995 | Palmer | |
| 5,515,098 A | 5/1996 | Carles | |
| 5,652,615 A | 7/1997 | Bryant et al. | |
| 5,664,948 A | 9/1997 | Dimitriadis et al. | |
| 5,708,478 A | 1/1998 | Tognazzini | |
| 5,805,989 A | 9/1998 | Ushida | |
| 5,974,034 A | 10/1999 | Chin et al. | |
| 6,011,977 A | 1/2000 | Brown et al. | |
| 6,029,045 A | 2/2000 | Picco et al. | |
| 6,088,349 A | 7/2000 | Zumkeller | |
| 6,163,683 A | 12/2000 | Dunn et al. | |
| 6,349,215 B1 | 2/2002 | Braun | |
| 6,463,454 B1 | 10/2002 | Lumelsky et al. | |
| 6,519,262 B1 | 2/2003 | Stephens et al. | |

(Continued)

FOREIGN PATENT DOCUMENTS

| | | |
|---|---|---|
| EP | 0443933 A1 | 8/1991 |
| EP | 1526666 A2 | 4/2005 |

(Continued)

OTHER PUBLICATIONS

"Harris Has Third Generation of SynchroCast", www.rwonline.com/printarticle.aspx. 15949, Radio World, The News Source for Radio Managers and Engineers.

(Continued)

*Primary Examiner* — Dominic E Rego
(74) *Attorney, Agent, or Firm* — Barnes & Thornburg LLP

(57) ABSTRACT

Radio broadcasting equipment along with a system design that provides specified booster transmitter locations, control and adjustment of transmitter power levels, analysis and provisioning of optimized antenna heights and antenna azimuths is provided that enables filling a dead zone in a radio broadcast area with a radio signal synchronized with the main transmitter(s) signal, wherein the radio broadcasting equipment includes a plurality of booster transmitters transmitting at a cumulative power level much higher than that of the main transmitter in the dead zone to which the plurality of booster transmitters are dedicated.

20 Claims, 3 Drawing Sheets

(56) References Cited

U.S. PATENT DOCUMENTS

| | | |
|---|---|---|
| 6,577,849 B1 | 6/2003 | Eaton et al. |
| 6,600,908 B1 | 7/2003 | Chan |
| 6,615,039 B1 | 9/2003 | Eldering |
| 6,671,880 B2 | 12/2003 | Shah-Nazaroff et al. |
| 6,771,625 B1 | 8/2004 | Beal |
| 7,038,589 B2 | 5/2006 | Schmidt et al. |
| 7,062,778 B1 | 6/2006 | Pattersson |
| 7,313,359 B2 | 12/2007 | Steelberg et al. |
| 7,313,361 B2 | 12/2007 | Steelberg et al. |
| 7,315,726 B2 | 1/2008 | Steelberg et al. |
| 7,363,001 B2 | 4/2008 | Steelberg et al. |
| 7,376,414 B2 | 5/2008 | Engstrom |
| 7,460,863 B2 | 12/2008 | Steelberg et al. |
| 7,490,053 B1 | 2/2009 | Emerson, III et al. |
| 7,500,258 B1 | 3/2009 | Eldering |
| 7,551,888 B2 | 6/2009 | Kopra et al. |
| 7,551,892 B1* | 6/2009 | Elliott ............... H04W 52/0216 455/41.1 |
| 7,555,361 B2 | 6/2009 | Nakamura et al. |
| 7,683,792 B2 | 3/2010 | Araiza-Boys |
| 7,826,444 B2 | 11/2010 | Irvin |
| 8,068,452 B2* | 11/2011 | Diao ............................. 370/328 |
| 2001/0022781 A1* | 9/2001 | Makipaa ................ H04H 20/18 370/316 |
| 2002/0004936 A1 | 1/2002 | Aras |
| 2002/0141491 A1 | 10/2002 | Corts et al. |
| 2002/0184091 A1 | 12/2002 | Pudar |
| 2003/0018971 A1 | 1/2003 | McKenna, Jr. |
| 2006/0019642 A1 | 1/2006 | Steelberg et al. |
| 2006/0117350 A1 | 6/2006 | Stallworth |
| 2006/0212409 A1 | 9/2006 | Steelberg et al. |
| 2007/0146200 A1 | 6/2007 | Norin et al. |
| 2007/0226608 A1 | 9/2007 | Virk et al. |
| 2007/0232326 A1 | 10/2007 | Johnson |
| 2008/0008285 A1 | 1/2008 | Smith et al. |
| 2008/0048873 A1 | 2/2008 | Araiza-Boys |
| 2008/0092162 A1 | 4/2008 | Lundy et al. |
| 2008/0127250 A1 | 5/2008 | DaCosta |
| 2008/0160940 A1 | 7/2008 | Jendbro |
| 2008/0187009 A1 | 8/2008 | Kim et al. |
| 2008/0209466 A1 | 8/2008 | Ishida et al. |
| 2008/0313169 A1 | 12/2008 | Walzien |
| 2009/0029672 A1 | 1/2009 | Manz |
| 2009/0045951 A1 | 2/2009 | Rajan et al. |
| 2009/0046616 A1 | 2/2009 | Martinez et al. |
| 2009/0046624 A1 | 2/2009 | Martinez et al. |
| 2009/0094648 A1 | 4/2009 | Patel et al. |
| 2009/0122749 A1 | 5/2009 | Byun |
| 2009/0154582 A1* | 6/2009 | Diao ..................... H04H 20/67 375/260 |
| 2009/0172724 A1 | 7/2009 | Ergen et al. |
| 2009/0197534 A1 | 8/2009 | Stenberg |
| 2009/0296856 A1 | 12/2009 | Smith et al. |
| 2010/0191585 A1 | 7/2010 | Smith |
| 2011/0065377 A1* | 3/2011 | Hieatt .................. H04H 20/103 455/3.01 |
| 2011/0149168 A1* | 6/2011 | Frerking ................ H04H 20/72 348/723 |
| 2012/0014370 A1* | 1/2012 | Devine ................. H04H 20/103 370/347 |
| 2012/0230240 A1 | 9/2012 | Nebat et al. |
| 2014/0036736 A1* | 2/2014 | Wyville ................. H04B 1/109 370/278 |
| 2014/0036969 A1* | 2/2014 | Wyville ................... H04B 1/38 375/219 |

FOREIGN PATENT DOCUMENTS

| | | |
|---|---|---|
| EP | 1816764 A2 | 8/2007 |
| EP | 1816765 A2 | 8/2007 |
| GB | 2195868 A | 4/1988 |
| JP | 5954342 U | 4/1984 |
| WO | 9300774 A1 | 1/1993 |
| WO | 2006/035242 A2 | 4/2006 |

OTHER PUBLICATIONS

"Simmons Uses Harris SynchroCast in Salt Lake", www.radioworld.com/printarticle.aspx, 13732, Radio World, The News Source for Radio Managers and Engineers.

"Harris to Showcase Intraplex SynchroCast Platform Improvements", www.radioworld.com/printarticle.com, 16545, Radio World, The News Source for Radio Managers and Engineers.

"Harris Has SynchroCast 3 for Multi-Transmitter Networks", www.radioworld.com/printarticle.aspx, 15980, Radio World, The News Source for Radio Managers and Engineers.

"Harris Corporation's Intraplex SynchroCast Digital Multiplexer Extends Reach of Popular News, Talk and Music Channels Throughout the Greek Isles", www.harris.com/view_pressrelease.asp, 1738.

"Harris Corporation's Intraplex SynchroCast Cigital Multiplexer Enhances Radio Coverage for Simmons Media in Salt Lake City", www.harris.com/view_pressrelease.asp, 1792.

"Harris SynchroCast 3 Enables Single-Frequency Networks Over IP Links", Radio Magazine, www.printthis.clickability.com/pt/cpt, Radio Magazine.

International Search Report for International Application No. PCT/US2010/048331, Sep. 10, 2010.

Written Opinion of The International Searching Authority for International Patent Application No. PCT/US2010/048331, Sep. 10, 2010.

Supplementary European Search Report for Application No. 10816113.4 dated Jul. 17, 2013.

* cited by examiner

EQUIPMENT, SYSTEM AND METHODOLOGIES FOR ROBUST COVERAGE IN A BROADCAST AREA

CROSS-REFERENCE TO RELATED APPLICATIONS

This United States Patent Application incorporates by reference in their entirety, the following pending applications: U.S. patent application Ser. No. 13/626,969, filed Sep. 26, 2012, entitled "Equipment, System And Methodologies For Transmitting Localized Auxiliary Information And Rds/Rbds Information Via Multiple Rf Frequencies, Rf Power, And Antenna Selection Of Boosters In A Segmented Listening Area Delivering Localized Auxiliary Information," U.S. patent application Ser. No. 13/245,482, filed Sep. 16, 2011, entitled "Equipment, System and Methodologies for Time Synchronization Between Multiple RF Frequencies, RF Power, and Antenna Selection of Boosters In a Segmented Listening Area," U.S. patent application Ser. No. 12/879,081, filed Sep. 10, 2010, U.S. Provisional Patent Application Ser. No. 61/241,790, filed on Sep. 11, 2009, entitled "Equipment, System and Methodologies For Segmentation Of Listening Area Into Sub-Areas Enabling Delivery Of Localized Auxiliary Information," and U.S. Provisional Patent Application Ser. No. 61/368,509, filed Jul. 28, 2010 and entitled "Equipment, System And Methodologies For Segmentation Of Listening Area Into Sub-Areas Enabling Delivery Of Localized Auxiliary Information."

FIELD OF THE INVENTION

Disclosed embodiments are directed, generally, to radio broadcasting equipment, as system and methodologies and the use of a plurality of booster/auxiliary transmitters to augment a main transmitter(s) for a radio broadcast area.

BACKGROUND

As shown in FIG. 1, radio broadcasters' listening areas are associated with a metropolitan area or geographic region 100. However, many listening areas 100 include geographic, geological or man made obstacles or regions 110 that impede the effective transmission of a radio broadcast signal from the main transmitter(s) 120.

These obstacles 110 result in "dead zones," 130 in which a radio broadcast signal cannot be effectively received by a radio listener's radio receiver.

It should be appreciated, as well, that the frequency and mode of modulation being used by the radio broadcaster's signal will affect the amount of signal reduction in a unique way. Thus, a dead zone for one particular FM frequency may be somewhat different than for another FM frequency. Likewise, the dead zone for an AM frequency may be somewhat different than for another AM frequency. Likewise, FM and AM frequencies may be more or less susceptible to signal reduction depending on other environmental issues including time of day, weather, presence of foliage on trees, etc. These discrepancies are well known in the art.

However, due to these factors and the configuration of terrain topology in a particular listening area, conventional use of booster or translator technology can result in signal interference issues that exacerbate the problem of weak radio signal delivery rather than providing improvement. Thus, for example, as shown in FIG. 2, the use of a conventional booster transmitter 140 results in providing a receivable signal in some portion of a dead zone 150 but also one or more interference zones 160 that suffer from interference resulting from the interaction between the signal of the main transmitter 120 and the signal transmitted by the booster transmitter 140.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In accordance with at least one disclosed embodiment, radio broadcasting equipment is provided that enables a radio broadcaster to reduce the size or effect of one or more dead zones in a listening area. The equipment includes a plurality of booster/auxiliary transmitters that are configured to transmit a signal as a single and selectable broadcast frequency, wherein the signal is synchronized among the plurality of booster/auxiliary transmitters, i.e., intra-plurality basis, as well as being synchronized with a main transmitter for the radio broadcast listening area in which the plurality of booster/auxiliary transmitters are geographically located. By utilizing a combination of a plurality of booster transmitters having active directionalization (e.g., using one or more directional antennae), transmitted signals are controlled in concert with the main transmitter and each other to contain and focus the interference. Additionally, a combined strength of the signals transmitted by the booster transmitters, overwhelms the signal transmitted by the main antenna in those areas where interference with the main antenna's signal would conventionally result in interference.

In accordance with one disclosed embodiment, the plurality of booster/auxiliary transmitters may be used to transmit multiple signals on different frequencies so as to be shared by multiple broadcasters using a plurality of frequencies so as to reduce the cost of installation and operation of that equipment.

BRIEF DESCRIPTION OF THE DRAWINGS

A more compete understanding of the present invention and the utility thereof may be acquired by referring to the following description in consideration of the accompanying drawings, in which like reference numbers indicate like features, and wherein.

DETAILED DESCRIPTION

Figure 1:
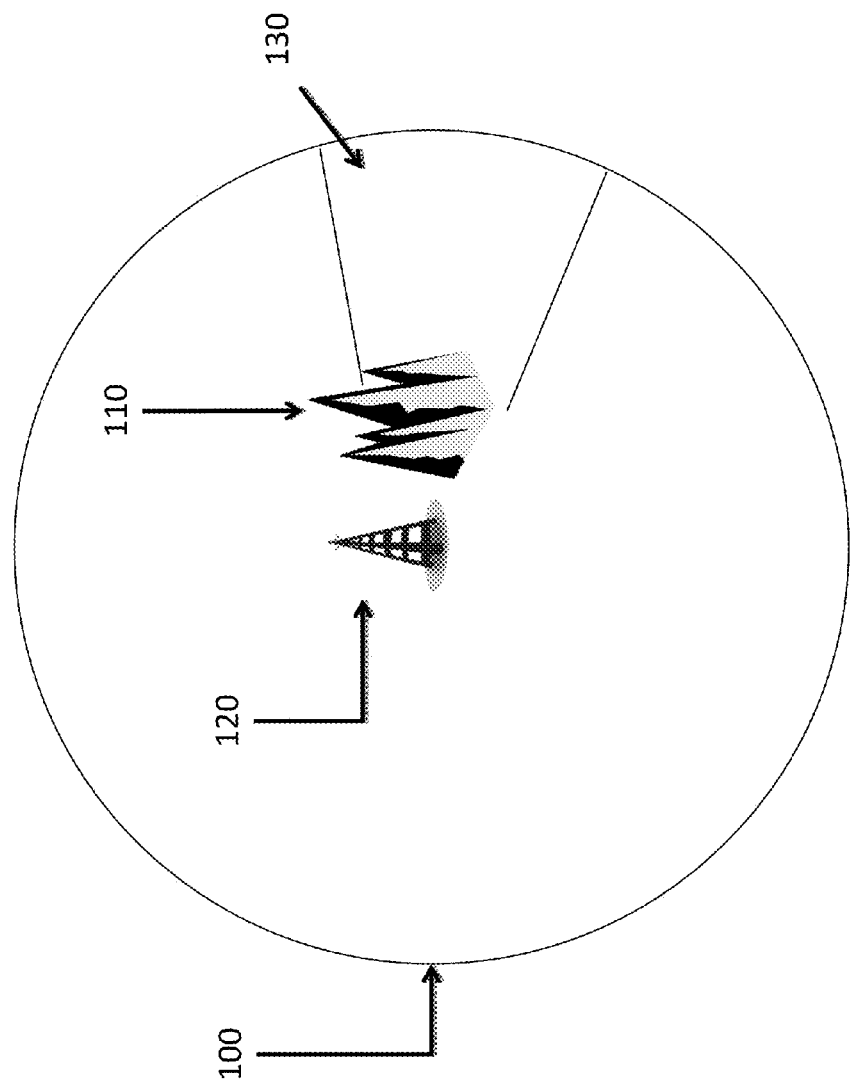
FIG. 1 is an example of a conventional listening area including a single main transmitter.

The description of specific embodiments is not intended to be limiting of the present invention. To the contrary, those skilled in the art should appreciate that there are numerous variations and equivalents that may be employed without departing from the scope of the present invention. Those equivalents and variations are intended to be encompassed by the present invention.

In the following description of various embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

As explained above, U.S. patent application Ser. Nos. 13/626,969, 13/245,482, 12/879,081, 61/241,790, and 61/368,509 are expressly incorporated by reference herein. Detailed descriptions of the figures in those applications have been omitted except where needed to supplement the present disclosure.

In explaining the operation of various disclosed embodiments, description of one or more "main transmitters" and "booster transmitters" is provided. It should be understood that the term "main transmitter" encompasses a transmitter that may be, for example, the only transmitter used by a radio broadcaster in a particular radio broadcasting area or it may be the most powerful (or one of the most powerful) transmitters in the radio broadcasting area.

To the contrary, the term "booster transmitter" (which is interchangeable with the term "signal boosters" or "auxiliary transmitters") includes low-power transmitters (relative to the maximum class of the main transmitter), which are conventionally used to improve communications in locations within the normal coverage area of a radio system where the radio signal is blocked or shielded due to natural terrain or man-made obstacles (e.g., to provide fill-in coverage but not increase the normal coverage area).

Although it is conventionally known that booster transmitters can be effective in weak or no-signal areas that may be present in a radio broadcaster's area of operation, conventional use of booster transmitters has not been widely adopted because it routinely results in additionally interference in the transmitted signal. Thus, although conventional booster transmitters can be used to compensate or accommodate for physical barriers to effective radio broadcast transmission, e.g., mountains, mountain ranges, steep valleys, large buildings, vegetation, etc., are not often used because they create interference with the main transmitter signal which results in an increase problem rather than a solution.

In accordance with the presently disclosed embodiments, it has been recognized that a plurality of booster transmitters, e.g., six, may be installed within a broadcast listening area in proximity to one another and a dead zone.

Figure 2:
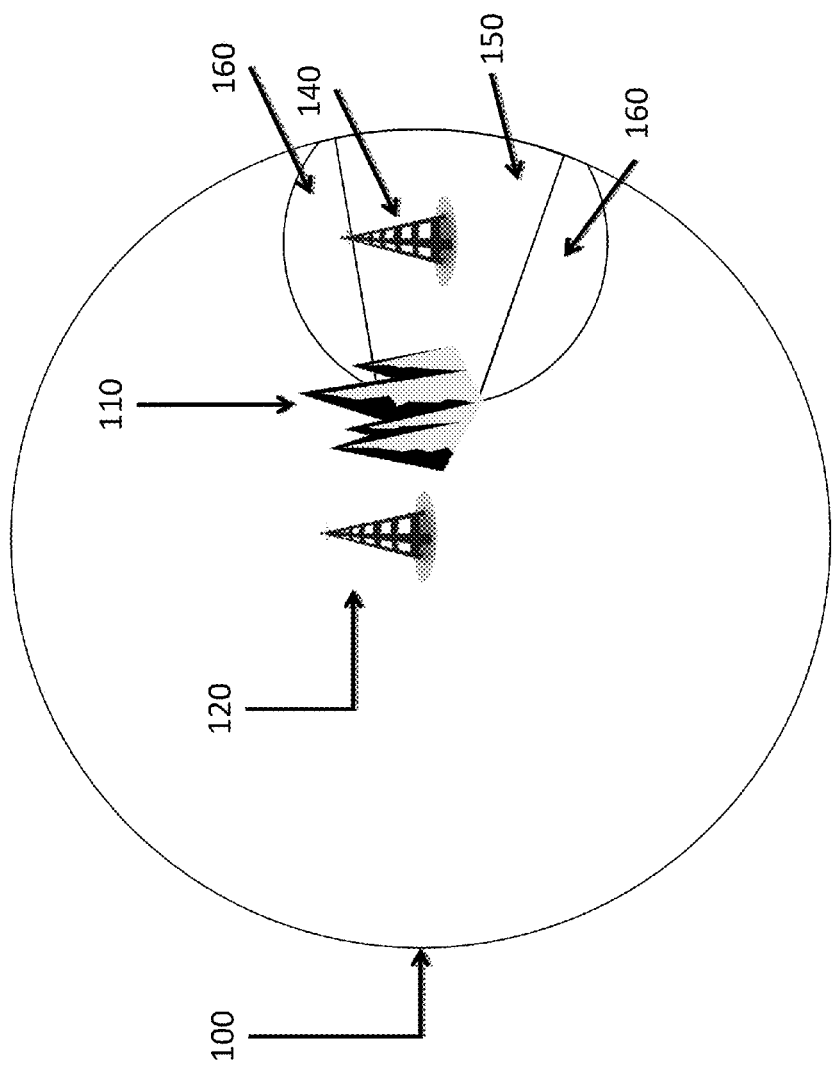
FIG. 2 is an example of a conventional listening area including a single main transmitter and a signal booster transmitter.
Figure 3:
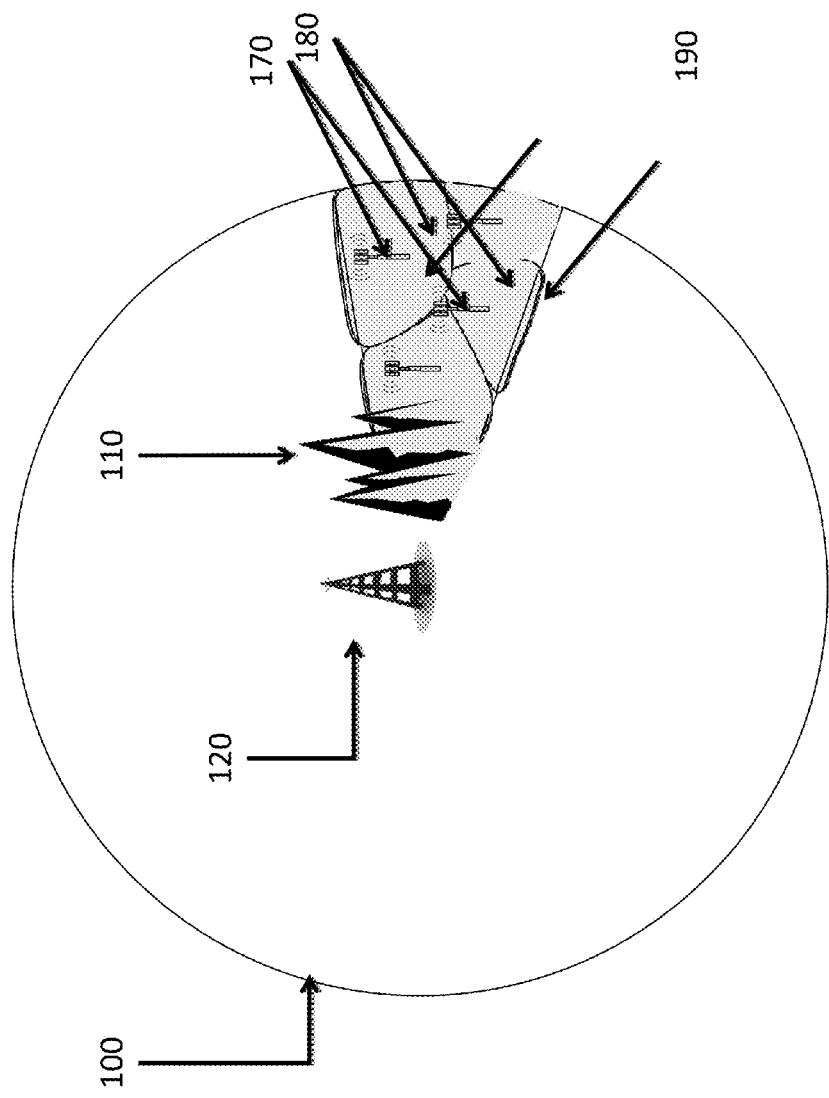
FIG. 3 is an example of components provided in accordance with at least one disclosed embodiment provided in combination with a main transmitter in a listening area.

As shown in FIG. 3, the plurality of booster transmitters 170 each have an associated zone of transmission 180. the resulting affect of the combined and synchronized transmission of signals from the plurality of booster transmitters 170 is that the dead zone shown in FIGS. 1-2, is filled with transmission of receivable signal in the zones 180. As a result of the focused propagation of the booster transmitters' signal, minimal interference is provided in the at the edges 190 of the dead zone.

The transmission of a radio broadcast signal is controlled by one or more controllers (e.g., implemented as a single processor controlling transmission of all the booster transmitters (and implemented in one of the booster transmitters) or as booster transmitter specific processors (and implemented in each of the booster transmitters) so as to enable synchronization of the transmitted signal among the plurality of booster transmitters. Likewise, the controller(s) may also enable the booster transmitters' transmitted signal to be synchronized with the signal transmitted by the main transmitter(s) for the listening area.

It is recognized that synchronization of the booster transmitters' signal with the transmitted signal of the main transmitter(s) may not be absolute and/or optimal at all times; as a result, to improve the perceived operation of the overall system, the cumulative power output of the booster transmitters' signal is selected so as to overwhelm that of the main signal in the dead zone to which the booster transmitters are dedicated. The ratio of the booster transmitters' signal power to the main transmitter signal power can vary from 3 dB to 30 dB or greater, depending on the RF channel condition, RF power level, and amount of signal fading and shadowing.

As a result, although the main transmitter(s) continues to transmit at a specified power level, the transmitted signal is obscured as a result of the booster transmitters' signal which has a much higher power level. Thus, any potential discrepancies between the booster transmitters' synchronized signal and that of the main transmitter are obscured or masked from a listener's radio receiver.

One implementation to accomplish this improved robustness and uniformity of coverage in a radio broadcast area involves the booster transmitters being configured to provide the dead zone filling operation on more than one RF frequency. As a result, a particular plurality of booster transmitters may be shared by more than one broadcaster and, therefore, may be used to support the filling of dead zones of listening area by more than one broadcaster using their particular FM broadcasting frequencies.

It should also be understood that the one or more processors used to control transmission synchronization among the plurality of booster transmitters and with the main transmitter (s) do so based on specialized software that enables the receipt and transmission of a broadcast signal in a controlled manner. Moreover, the cumulative power at which the plurality of booster transmitters are transmitting is configurable and adjustable depending on, for example, time of day (where a radio signals transmission mode is particularly affected by such issues), weather, and/or changing topology of a landscape of the broadcast area (for example, the amount of foliage present on trees).

Thus, in accordance with at least one disclosed embodiment, radio broadcasting equipment is provided that enables filling a dead zone in a radio broadcast area with a radio signal synchronized with the main transmitter(s) signal, wherein the radio broadcasting equipment includes a plurality of booster transmitters transmitting at a cumulative power level much higher than that of the main transmitter in the dead zone to which the plurality of booster transmitters are dedicated.

The MaxxCasting™ system deploys "zones" within a defined service area of a primary (main) FM broadcast transmitter. These zones can contain 1 to N number of on-channel, same frequency booster transmitters that broadcast, in a simulcast (synchronized) manner. The design of the zone is such that the synchronized booster transmitters that comprise the zone create a signal (and RF field density) over the intended coverage area for that zone which is significantly higher than the main transmitter signal. This results in a FM "capture" effect occurring at a receiver in the listening area, a phenomenon widely known with FM reception in which only the stronger of multiple signals at, or near, the same frequency will be demodulated. This effect also provides an improvement in performance of the audio output from the receiver in terms of quality. See INTERNATIONAL TELECOMMUNICATIONS UNION (ITU); ITU Radio Communication Sector; ITU-R BS.1114-5: Systems for terrestrial digital sound broadcasting to vehicular, portable and fixed receivers in the frequency range 30-3,000 MHz, incorporated by reference.

In a typical broadcast transmitter implementation, transmission sites are often chosen that provide the largest amount of RF coverage and to reduce implementation costs. It is well known that transmitter antennas with higher radiation centers (above local terrain) have lower RF path loss slopes, resulting in a larger geographical coverage area to a receiver. However, in a simulcast situation involving multiple transmitters on the same frequency (often referred to as a single frequency network, or SFN) this approach creates a larger interference area where the main and the booster signals are close in power level, but arrive at the receiver at larger than acceptable differential time delays, creating unacceptable audio impairment. See ITU-R BS.412-9 17, ANNEX 3: Protection ratio for FM sound broadcasting in the case of the same programme and synchronized signals, incorporated by reference herein.

This interference area is proportional to the square of the radius of the transmitters' coverage area.

By deploying multiple synchronized transmitters in the desired coverage zone with lower antenna radiation heights, the coverage radius of each booster is reduced, thereby decreasing the interference area with the main transmitter. Highly directional antennae placed on low to the ground transmitter sites allows plurality of boosters to maximize coverage area. The number of booster sites utilized varies depending on terrain and size of the affected area.

In addition, by deploying the booster transmitter radiation centers at lower heights, the path loss slope of the booster is generally greater than the main transmitter. See Okamura, Y. a kol.: Field Strength and its Variability in VHF and UHF Land-Mobile Radio Service. Rev. Elec. Comm Lab. No. 9-10 pp. 825-873, 1968 and Hata, M.: Empirical Formula for Propagation Loss in Land Mobile Radio Services. IEEE Trans. Vehicular Technology, VT-29, pp. 317-325, 1980, both incorporated by reference in their entireties.

Conventionally, a main transmitter is deployed at the highest level above the local terrain that is allowed by regulations, so that the largest coverage area can be achieved. Because the path loss slope of the synchronized booster transmitters in a zone have greater path loss slopes than the main transmitter, the signal from the synchronized booster transmitters tends to decrease more rapidly as a function of distance from the transmitting antenna. This has the effect of reducing the geographical area where the signal from the booster transmitters is close in power to the main transmitter. As a result, the ability to both provision and confine the effect of the plurality of booster transmitters enables the ability to precisely control signal propagation and protect against interference.

The time differential between two signals and the RF signal power ratio of the signals determines the amount of distortion that ends up in the audio signal presented to the listener. Distortion of FM audio increases as a function of the time separating two indistinguishable signals. Similarly, distortion decreases as the RF ratio grows.

Therefore, another benefit of deploying multiple synchronized transmitters in a desired coverage zone with lower antenna radiation heights, is that the time of arrival of the sign from the main transmitter can be more closely synchronized with the booster transmitter signal over a geographical area of interest This area of interest may occur when the RF ratios from the main transmitter and the booster transmitter are of similar levels (0 to 16 dB for Monophonic transmission, and 0 to 24 dB for Stereophonic transmission, for example). By controlling the time of arrival delays of the signals in these areas, the amount of distortion can also be controlled to an acceptable level to the listener, as evidenced by Kean, John, and Sheffield, Ellyn, Design Parameters for Analog FM Signal Repeaters Based on Listener Testing, Presented at the 2013 NAB Engineering Conference.

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

For example, it should be understood that various disclosed embodiments relate to the broadcasting of analog radio broadcasting signals. However, it should be understood that the embodiments are not limited to analog radio broadcasting and may by utilized in digital audio radio broadcasting, for example, Eureka 147 (also known as Digital Audio Broadcasting (DAB)), 'DAB+, FM band in-band on-channel (FM IBOC) broadcasting including HD Radio (OFDM modulation over FM and AM band IBOC sidebands) and FMeXtra (FM band IBOC subcarriers), Digital Radio Mondiale (DRM) and its extension (DRM+) (OFDM modulation over AM band IBOC sidebands), AM band in-band on-channel (AM IBOC) including HD Radio (AM IBOC sideband) and DRM, Satellite radio including,e.g., WorldSpace, Sirius XM radio, and MobaHo!, Integrated Services Digital Broadcasting (ISDB), Low-bandwidth digital data broadcasting over existing FM radio and Radio Data System (also known as RDS), etc.

It should be appreciated that, in accordance with at least one embodiment of the invention, the system may be implemented in conjunction with the transmission of digital radio signals rather than analog radio signals. Moreover, it should be appreciated that at least one embodiment of the invention may be implemented in conjunction, and be compatible, with the DAB standard to enable implementation outside the United States radio markets.

Further, it should be appreciated that the various disclosed embodiments and their individual aspects and features also may be utilized in the transmission of analog and/or digital television signals.

Moreover, it should be understood that various connections are set forth between elements in the following description; however, these connections in general, and, unless otherwise specified, may be either direct or indirect, either permanent or transitory, and either dedicated or shared, and that this specification is not intended to be limiting in this respect.

Additionally, it should be understood that the functionality described in connection with various described components of various invention embodiments may be combined or separated from one another in such a way that the architecture of the invention is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Various components of the invention may be provided in alternative combinations operated by, under the control of or on the behalf of various different entities or individuals.

Further, it should be understood that, in accordance with at least one embodiment of the invention, system components may be implemented together or separately and there may be one or more of any or all of the disclosed system components. Further, system components may be either dedicated systems or such functionality may be implemented as virtual systems implemented on general purpose equipment via software implementations.

Unless otherwise expressly stated, it is in no way intended that any operations set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following inventive concepts.

Although the utility of various invention embodiments has been described in connection with the distribution of promotional content, it should be understood that distributed information is not limited to promotional content but may also or alternatively include non-promotional material.

As a result, it will be apparent for those skilled in the art that the illustrative embodiments described are only examples and that various modifications can be made within the scope of the invention.

We claim:

1. Radio broadcasting equipment comprising:
   a plurality of auxiliary transmitters associated with at least one main transmitter, the at least one main transmitter transmitting broadcast area wide programming on a radio frequency for a respective broadcast area, wherein the plurality of auxiliary transmitters transmit on the same radio frequency as the at least one main transmitter; and
   at least one processor running software to control synchronization of a radio signal transmitted by the plurality of auxiliary transmitters on an intra-plurality basis as well as control synchronization of the plurality of auxiliary transmitters' radio signal with a radio signal transmitted by the at least one main transmitter,
   wherein a cumulative power level for the radio signal transmitted by the plurality of auxiliary transmitters overwhelms the power level of the radio signal transmitted by the at least one main transmitter in a radio broadcast area dead zone associated with the plurality of auxiliary transmitters.

2. The radio broadcasting equipment of claim 1, wherein the broadcast area is a radio broadcasters' listening area.

3. The radio broadcasting equipment of claim 1, wherein the radio broadcast area dead zone is caused by a geographic, geological or man made obstacle that impedes the effective transmission from the at least one main transmitter.

4. The radio broadcasting equipment of claim 1, wherein the radio frequency is an FM frequency.

5. The radio broadcasting equipment of claim 1, wherein the radio frequency is an AM frequency.

6. The radio broadcasting equipment of claim 1, wherein the cumulative power level for the radio signal transmitted by the plurality of auxiliary transmitters that overwhelms the power level of the radio signal transmitted by the at least one main transmitter reduces the size or effect of one or more radio broadcast area dead zones in the radio broadcast area.

7. The radio broadcasting equipment of claim 1, wherein the plurality of auxiliary transmitters are configured to transmit radio signals at a single and selectable broadcast frequency.

8. The radio broadcasting equipment of claim 1, wherein the intra-plurality basis use active directionalization including at least one directional antennae.

9. The radio broadcasting equipment of claim 1, wherein the active directionalization contains and/or focuses interference by overwhelming the signal transmitted by the at least one main transmitter using the combined strength of the signals transmitted by the plurality of auxiliary transmitters.

10. The radio broadcasting equipment of claim 1, wherein the plurality of auxiliary transmitters transmit multiple signals on different frequencies so as to be shared by a plurality of main transmitters, including the at least one main transmitter, wherein each of the plurality of main transmitters transmit broadcast area wide programming on different frequencies multiple broadcasters using a plurality of frequencies so as to reduce the cost of installation and operation of that equipment.

11. The radio broadcasting equipment of claim 1, wherein each of the plurality of auxiliary transmitters are dedicated to at least one dead zone and cumulative power output of the plurality of auxiliary transmitters signal is selected so as to overwhelm that of the main signal in the dead zone to which the auxiliary transmitters are dedicated.

12. The radio broadcasting equipment of claim 11, wherein a ratio of signal power for the plurality of auxiliary transmitters to the signal power of the at least one main transmitter varies from 3 dB to 30 dB, depending on the RF channel condition, RF power level, and amount of signal fading and shadowing.

13. The radio broadcasting equipment of claim 1, wherein the at least one main transmitter continues to transmit at a specified power level while the plurality of auxiliary transmitters transmit at a higher power level.

14. The radio broadcasting equipment of claim 1, wherein the plurality of auxiliary transmitters each have higher path loss slopes than the at least one main transmitter and the transmitted signal power from the plurality of auxiliary transmitters decreases more rapidly than that of the at least one main transmitter as a function of distance from the transmitters.

15. The radio broadcasting equipment of claim 1, wherein the RF ratios from the main transmitter and at least one of the plurality of auxiliary transmitters are between 0 to 16 dB for Monophonic transmission, and 0 to 24 dB for Stereophonic transmission.

16. The radio broadcasting equipment of claim 1, wherein the plurality of auxiliary transmitters and the at least one main transmitter transmit analog radio signals.

17. The radio broadcasting equipment of claim 1, wherein the plurality of auxiliary transmitters and the at least one main transmitter transmit digital audio signals.

18. The radio broadcasting equipment of claim 1, wherein the intra-plurality basis use active directionalization including at least one directional antennae.

19. A method of augmenting transmission of a main transmitter transmitting broadcast area wide programming, the method comprising:
   transmitting a radio signal, on a plurality of auxiliary transmitters associated with the at least one main transmitter, the at least one main transmitter transmitting broadcast area wide programming on a radio frequency for a respective broadcast area;

synchronizing the radio signal transmitted by the plurality of auxiliary transmitters using at least one processor running software to control synchronization, wherein the radio signal transmitted by the plurality of auxiliary transmitters is transmitted on an intra-plurality basis, wherein the radio signal transmitted by the plurality of auxiliary transmitters as well as control synchronization of the plurality of auxiliary transmitters' radio signal with a radio signal transmitted by the at least one main transmitter, wherein a cumulative power level for the radio signal transmitted by the plurality of auxiliary transmitters overwhelms the power level of the radio signal transmitted by the at least one main transmitter in a radio broadcast area dead zone associated with the plurality of auxiliary transmitters.

20. The method of claim 19, wherein the broadcast area is a radio broadcasters' listening area.

* * * * *